3,170,910
CATIONIC AZO COMPOUNDS
Otto E. Neracher, Mount Vernon, N.Y., Abraham Cantor, Elkins Park, Pa., and William Schmidt, Flushing, N.Y., assignors to West Laboratories, Inc., Long Island City, N.Y., a corporation of New York
No Drawing. Filed June 22, 1962, Ser. No. 204,625
1 Claim. (Cl. 260—152)

This invention relates to a new class of azo compounds which are cationic in nature. More particularly, the invention relates to new compounds which may be referred to as 4'-(ω-di-N,N-substituted amino-lower alkoxy) azo-benzenes of the formula:

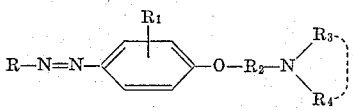

wherein R represents a phenyl radical or a substituted phenyl radical such as alkyl substituted phenyl, alkoxy substituted phenyl, halogen substituted phenyl and naphthyl radicals, $R_1$ represents a hydrogen, hydroxy or lower alkoxy group, $R_2$ is an alkyl group having 2 to 4 carbon atoms and the group

is a secondary amino radical, such as an N,N-lower dialkyl amino, N,N-lower dialkanol amino, piperidyl, or morpholinyl radical.

The formulas for salts and quaternary ammonium derivatives need not be presented, as they can be readily visualized from the foregoing formula of the amines. It should be noted, however, that salts can be mineral acid salts, such as the hydrochloride, sulfate, or phosphate salts, as well as acetic acid, or other biologically acceptable organic acid salts. The quaternizing agents can be considerably varied, and include alkyl halides, such as methyl iodide, ethyl bromide, cetyl bromide, and lauryl bromide, alkyl sulfates, such as dimethyl sulfate, benzyl halides, such as benzyl chloride, halo-substituted benzyl halides, such as p-chloro benzyl chloride and 3,4 dichloro benzyl chloride, alkoxy benzyl halides, such as p-methoxy benzyl chloride and other known quaternizing agents.

The products of this invention are solids, ranging in color from yellow-orange to dark brown, with the salt and quaternary ammonium forms generally being crystalline. The amines are soluble in most common organic solvents, but insoluble in water, while the salts and quaternary ammonium derivatives are soluble in most polar organic solvents, and are moderately soluble in water.

A large number of products embraced by the general formula presented above have been found to have antimicrobial activity by conventional test methods. They also have toxic properties making them valuable as insecticidal, acaricidal, ovicidal, and nematocidal agents, as well as agents for combatting internal parasites, such as helminths in warm blooded animals. In addition, they are useful as dyestuffs and coloring agents for cellulosic materials, and for synthetic fibers and plastics, such as those of the polyacrylic type.

The new azo compounds may be prepared in various ways from readily available starting materials. The preferred method involves converting the appropriate 4'-hydroxy azobenzene compound of the formula:

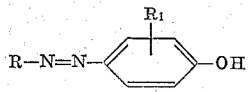

wherein R and $R_1$ have the significance noted above, to the sodium salt, as for example by reaction with sodium hydride in a suitable organic solvent such as toluene. The sodium salt, suitably in the same solvent medium is then reacted with a tertiary amine halide of the formula:

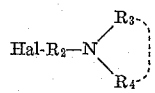

wherein $R_2$, and the group

have the significance noted above. The amine halide, suitably the chloride, is added dropwise as a solution in the same organic solvent (i.e., toluene) while maintaining the reaction mixture at reflux temperature. Refluxing is continued until reaction is complete, generally about 16 hours, and the solvent is then stripped off to recover the 4'-(ω-di-N,N-substituted amino-lower alkoxy) azobenzene of the formula:

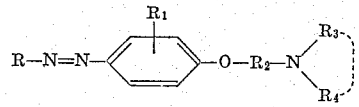

Acid salts of these tertiary amine compounds are prepared by dissolving the amine in non-polar solvent and heating with the stoichiometric amount of the desired acid, such as hydrochloric, sulphuric, phosphoric, or acetic acid. The precipitated salt can be separated by filtration, washed with additional solvent to remove any unreacted amine, and then taken up in a polar solvent and purified, as by crystallization therefrom.

Quaternary ammonium derivatives are prepared by heating to reflux in a non-polar solvent, such as toluene molar equivalent amounts of the tertiary amine and the quaternizing agent. Refluxing is continued for an extended period, generally about 16 hours, and the precipitated quaternary ammonium compound thus formed is recovered, as by filtering, washing with non-polar solvent and drying. The product thus obtained will generally have a purity of 98% or higher, but if desired, further purification can be effected by recrystallization from a polar solvent.

The following examples illustrate the present invention, but are not to be construed as limiting.

EXAMPLE I

Preparation of 4'-(ω-di-N,N-substituted amino-lower alkoxy) azobenzenes of the formula:

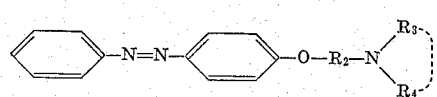

and salts and quaternary ammonium derivatives thereof

STEP 1

To a suspension of 17.3 g. of 50% sodium hydride in 300 ml. toluene is added 71.3 g. p-hydroxyazobenzene in 750 ml. toluene. After completing addition, the batch is heated to reflux for 2 hours, effecting substantially complete conversion to the sodium derivative. To the resulting dispersion, maintained at reflux temperature is added dropwise, a solution of 43 g. of 2-dimethylaminoethyl chloride in 100 ml. of toluene. Refluxing is continued for about 16 hours, and then the batch is filtered and the solvent stripped from the filtrate by heating to 150° C. under vacuum. The product thus obtained:

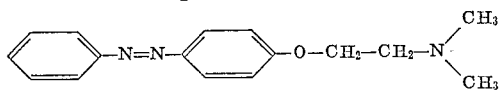

is a brown solid having a melting point of 50° C. at a purity of 97%.

In the foregoing reaction, many other di-substituted amino alkyl halides can be employed to produce products having variation in the amine moiety. Thus, for example, when starting with diethanolaminoethyl chloride, the product obtained is:

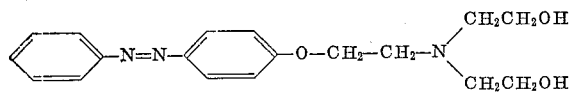

When starting with N,N-diisopropylaminoethyl chloride, the product obtained is:

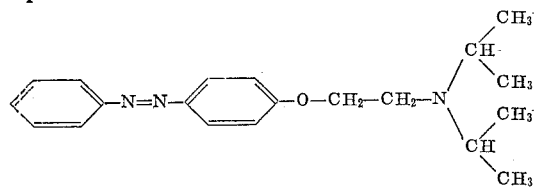

When starting with N,N-dimethylaminopropyl chloride, the product obtained is:

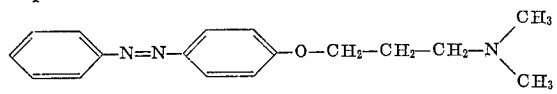

When starting with N,N-dimethylamino-2-methylpropyl chloride, the product obtained is:

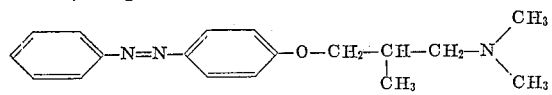

When starting with piperidinoethyl chloride, the product obtained is:

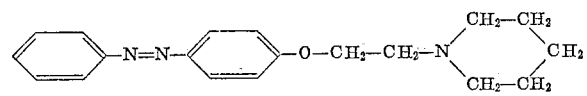

When starting with morpholinopropyl chloride, the product obtained is:

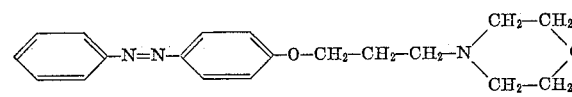

STEP 2

Two grams of 4'-(2-dimethylaminoethoxy) azobenzene is dissolved in benzine and gaseous HCl is passed through the resulting solution. The amine hydrochloride salt which precipitates is separated by filtration, washed with additional benzine, and then dried, yielding 1.7 g. of a yellow solid melting at 188° C. In like manner, other of the tertiary amine compounds above mentioned can be converted to the hydrochloride salt, or by proper selection of acid, to the sulfate, phosphate, acetate, or other biologically acceptable acid salt.

STEP 3

In preparing a quaternary ammonium derivative 5.5 g. of 4'(2-dimethylaminoethoxy) azobenzene and 2.8 g. of benzyl chloride are refluxed in 75 ml. of toluene for 16 hours. The resulting precipitate is collected, washed several times with toluene and dried in vacuo at 100° C. The final product which may be represented by the formula:

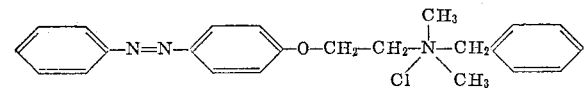

is a yellow powder, which at 99% purity, has a melting point of 185° C.

Other quaternary ammonium derivatives of the 4'(2-dimethylaminoethoxy) azobenzene, can be prepared by substituting in the foregoing reaction, other quaternizing agents to yield derivatives such as:

The p-chlorobenzyl chloride, M.P. 176° C.
The p-methoxybenzyl chloride, M.P. 189° C.
The butyl bromide, M.P. 231° C.
The methosulfate, M.P. 171° C.

In like manner, various quaternary ammonium derivatives can readily be prepared from other of the tertiary amines above described.

EXAMPLE II

Preparation of 4'-(ω-di-N,N-substituted amino-lower alkoxy) azobenzenes of the formula:

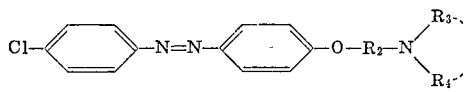

and salts and quarternary ammonium derivative thereof

Following the procedure described in Example I, Step 1, but starting with 4-chloro-4'-hydroxy azobenzene, there is obtained a tertiary amine of the formula:

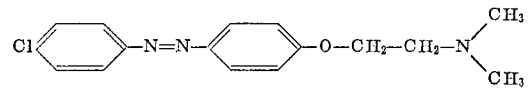

which is a brown solid melting at 74° C.

This is converted by the procedure of Example I, Step 2, to the hydrochloride salt, a light brown solid, melting at 217° C.; and by the procedure of Example I, Step 3, to the quaternary ammonium benzyl chloride derivative, a yellow-tan solid melting at 204–6° C., and to the p-chlorobenzyl chloride derivative, a yellow-tan solid melting at 213–14° C.

As in Example I, similar tertiary amines having varied amino alkoxy moieties can be prepared and respectively converted to desired acid salts and quarternary ammonium derivatives.

EXAMPLE III

Following the procedure of Example I, but starting with 4-chloro-2',4'-dihydroxy azobenzene, there are obtained tertiary amines of the formula:

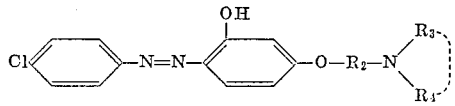

and salts and quarternary ammonium derivatives thereof.

Typical of such products are 4-chloro-2'-hydroxy-4'-(N,N-dimethylaminoethoxy) azobenzene, a red-brown solid melting at 96° C., and its quaternary ammonium p-chlorobenzyl chloride derivative, an orange solid melting at 194° C.

EXAMPLE IV

Following the procedure of Example I, but starting with 4-chloro-2'-methoxy-4'-azobenzene, there are obtained tertiary amines of the formula:

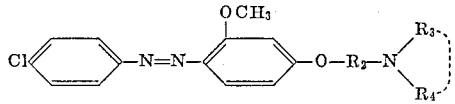

and salts and quaternary ammonium derivatives thereof.
Typical of such products are 4-chloro-2'-methoxy-4'-

(N,N-dimethylaminoethoxy) azobenzene, a brown solid melting at 77° C., and its quarternary ammonium p-chlorobenzyl chloride derivatives, a yellow solid, melting at 205° C.

Various changes and modifications in the products and processes herein disclosed will occur to those skilled in the art, and to the extent that such changes and modifications are embraced by the appended claim, it is to be understood that they constitute part of the present invention.

We claim:

A cationic azo compound selected from the group consisting of (1) azo tertiary amines of the formula:

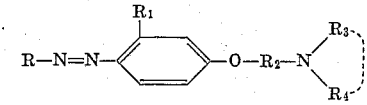

wherein R is selected from the group consisting of phenyl and p-chloro phenyl radicals, $R_1$ is selected from the group consisting of hydrogen, hydroxy and lower-alkoxy radicals, $R_2$ is an alkyl group having 2 to 4 carbon atoms, and the group

is a secondary amino radical selected from the group consisting of N,N-lower dialkyl amino, N,N-lower dialkanol amino, piperidyl, and morpholinyl radicals, (2) biologically acceptable salts of said amines with acids, and (3) quaternary ammonium derivatives of said amines.

References Cited in the file of this patent
UNITED STATES PATENTS

| | | |
|---|---|---|
| 2,128,256 | Krzikalla et al. | Aug. 30, 1938 |
| 2,140,944 | Schirm | Dec. 20, 1938 |

FOREIGN PATENTS

| | | |
|---|---|---|
| 1,177,997 | France | Dec. 8, 1958 |
| 337,198 | Switzerland | May 15, 1959 |